United States Patent [19]

Bindle et al.

[11] 4,217,626
[45] Aug. 12, 1980

[54] AUTOMOBILE HEADLIGHT CHANGE SYSTEM

[76] Inventors: Edward A. Bindle, 5209 Flushing Rd.; Julius E. Theriault, 5251 Flushing Rd., both of Flushing, Mich. 48433; Wesley J. Toll, 6179 David Berger St., Mt. Morris, Mich. 48458

[21] Appl. No.: 945,611

[22] Filed: Sep. 25, 1978

[51] Int. Cl.² .......................... B60Q 1/02; B60Q 1/08
[52] U.S. Cl. ........................................ 362/67; 362/20; 362/83; 362/233; 362/428; 315/82
[58] Field of Search ................. 362/66, 67, 20, 68, 362/70, 83, 233, 420, 425, 427, 428; 315/82, 88, 89, 90

[56] References Cited

U.S. PATENT DOCUMENTS

| | | | |
|---|---|---|---|
| 2,032,515 | 3/1936 | Troup | 362/20 |
| 2,557,531 | 6/1951 | Blanchet | 362/20 |
| 3,058,030 | 10/1962 | Simpkins | 315/82 |
| 3,206,637 | 9/1965 | Finken | 315/88 |
| 3,308,338 | 3/1967 | Seidler | 315/89 |

Primary Examiner—Samuel W. Engle
Assistant Examiner—Donald P. Walsh
Attorney, Agent, or Firm—Harry R. Dumont

[57] ABSTRACT

A mechanism for substituting a replacement headlight for a burned out or broken one. The mechanism includes a rotating disk and pneumatic actuating mechanism therefor. The actuating mechanism control is operable by the driver from the inside of the vehicle without requiring either stopping the engine or alighting from the vehicle.

5 Claims, 4 Drawing Figures

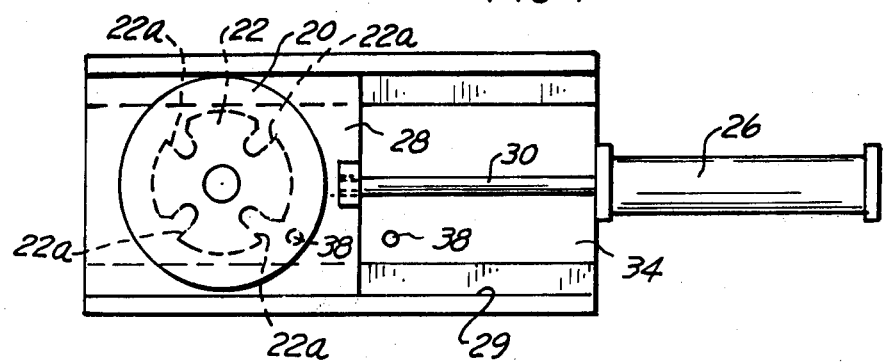
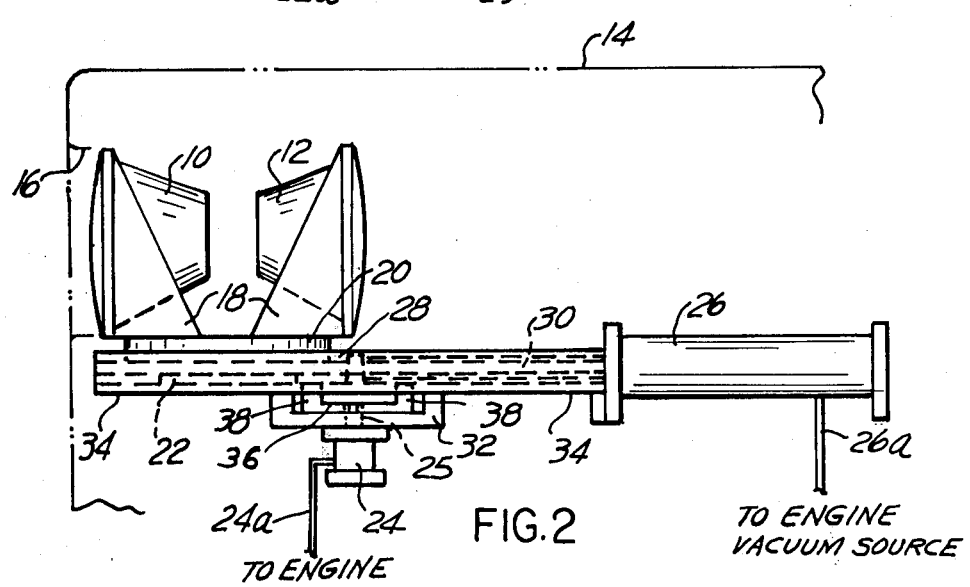
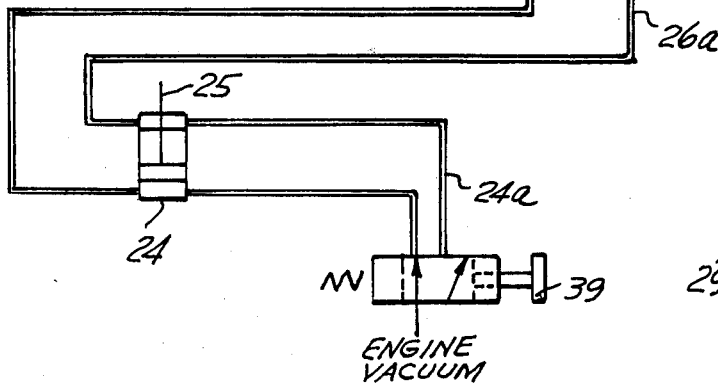
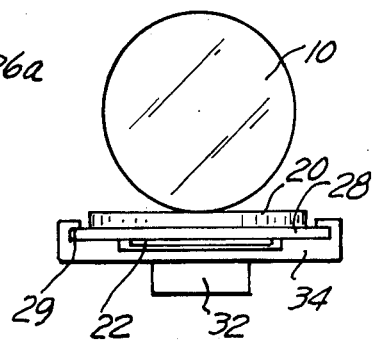

AUTOMOBILE HEADLIGHT CHANGE SYSTEM

BACKGROUND OF THE INVENTION

This invention relates to a system particularly adaptable for automobile headlights having a mechanical means for storing and then rotating a replacement headlight and putting it in the place of a burned out headlight, such means being operable from inside the vehicle from the dash of the automobile. Prior art devices are known in which multiple bulb containers are rotated on a revolving plate with a relatively complicated system for registering the replacement bulb into an operative position. Such a multiple bulb system is shown and described in J. M. M. Troup, U.S. Pat. No. 2,032,515 issued on Mar. 3, 1936 for "Rotary Bulb Container".

Similar rotating systems in which open circuited lamps are replaced with operable lamps are shown and described in R. Seidler, U.S. Pat. 3,308,338 issued on Mar. 7, 1967 for "Device for Automatically Replacing an Open Circuited Lamp With a New Lamp". This patent discloses an escapement mechanism in which power for turning the support for the plurality of lamps is supplied by a spiral spring mechanism.

Still other systems are known for replacing headlights involving swingable support members for the light with diverse linkages and mechanisms to achieve the changeover between inoperative and operative position of the replacement light.

SUMMARY OF THE PRESENT INVENTION

The present invention will be seen to provide an automobile headlight mechanism which replaces an inoperable headlight with an operable one through a simple but reliable rotating disk and slide system which is actuated within the vehicle by a pneumatic operating mechanism. The source of working fluid used is available from the engine in its normal operating condition. Thus, it is not necessary to turn off the engine nor is it required for the driver to alight from the vehicle to achieve the changeover. The mechanism is of a shape and size easily accomodated within the limits of the automobile fender structure.

BRIEF DESCRIPTION OF THE DRAWINGS

For a more complete understanding of the present invention as described in the following specification, reference is made to the accompanying drawings in which like elements and parts are identified with like numerals and in which:

FIG. 1 is a top plan view of the mechanism used for headlight changeover;

FIG. 2 is a side elevational view of the system as incorporated in an automobile fender, with parts broken away;

FIG. 3 is a left side elevational view of the apparatus of FIG. 1 illustrating a headlight in operative position; and FIG. 4 is a schematic diagram showing the pneumatic control system incorporated in our invention.

DETAILED DESCRIPTION OF THE PREFERRED EMBODIMENT

As best shown in FIG. 2, a pair of headlights 10 and 12 are mounted diametrically opposite one to the other with headlight 10 in its operable position. The outline of the automobile fender is shown in phantom line 14. At the forward end of the fender 14 there is provided an opening 16 with which the operable headlight 10 is registered. In each case the headlight is held by a vertical mounting bracket 18 which is fixed at its base to a rotary disk 20.

As shown in FIG. 1, a notched plate 22 is positioned below the lower surface of the disk 20. The two parts are connected one with the other for conjoint rotation. The operation of the headlight change system is provided through a pair of pneumatically operated cylinders 24, 26. The cylinder 26 has the function of operating a slide 28. It has its rod 30 left hand end threadably attached to the right hand end of the slide 28. The cylinder 24 is attached to a bracket 32 which in turn is fixed to the lower surface of a base 34 which is adapted to permit sliding movement of the slide 28 in a longitudinal channel 29 formed in the base 34. The rod 25 of the pneumatic cylinder 24 is threadably attached at its upper end to a vertically moveable member 36. The member 36 has extending from its upper surface a pair of spaced pins 38. Now with reference to FIGS. 1 and 2, it will be seen that responsive to the actuation of the pneumatic cylinder 24 by the depression of actuator button 39, the member 36 will be moved upwardly thus causing the pins 38 to be raised into the path of the cut-out portions 22a of the notched plate 22. The manner in which the two pneumatic cylinders 24 and 26 operate to rotate the disk 20 and change the headlights 10, 12 will be further clarified and explained in the section "Description of Operation" hereinafter.

As shown in FIG. 2, both the pneumatic cylinders 24, 26 are connectible to vacuum sources, that is, to the vehicle engine vacuum source which is readily available for their operation. It will further be understood that the two headlights 10, 12 are in each case electrically connected to a source of DC potential for their operation. Details of this connection are well known in the art and are not shown in the interest of brevity and simplification.

DESCRIPTION OF OPERATION

In the normal position shown in FIG. 2, the headlight 10 is in operable position and the slide 28 is in its forward or extreme left hand position on base 34. The replacement headlight 12 is facing rearwardly in its inoperable storage position. When the headlight 10 burns out or is broken by a stone or otherwise becomes inoperative, the driver can actuate the system by the pushbutton 39 or similar actuating device. The pushbutton 39 connects the source of vacuum available from the engine in that manner well known to the art causing it to be connected to line 24a thus to operate the piston of the cylinder 24. This will raise member 36 upwardly by the operation of the rod 25 and cause its two upstanding pins 38 to protrude through opposed openings provided in the base 34 and into the path of the notched plate 22. After the pneumatic cylinder 24 has reached the top of its stroke, engine vacuum will be connected to the cylinder 26 through line 26a causing it to retract and to move the slide 28 in a rightward direction by the operation of rod 30. Thus, the notched plate 22 and the disk 20 carrying the headlights 10 and 12 are rotated through 180°. This rotation has placed the spare headlight 12 in a forward and operating position. Now when the driver releases the activating device such as pushbutton 39, vacuum is applied to retract the rod 25 of the pneumatic cylinder 24. The cylinder 26 is then operated to cause its rod 30 to move the slide 28 leftwardly to its extreme left hand position and the sequence of light change is then complete.

It will thus be seen that we have provided by our invention a simple but reliable system for headlight change which is actuable by the driver from within the car with a minimum of effort and time required.

We claim:

1. An automobile headlight change system, comprising:
   a automobile engine vacuum source;
   a slide mounted in the fender of the automobile and slidable reciprocally forwardly and backwardly;
   a rotatable disk mounted on said slide;
   a notched plate operatively connected to said disk for controlling its rotation;
   a pair of headlights mounted on said disk, one facing forwardly in an operative position and the other facing rearwardly in a storage position.
   a first pneumatically operated cylinder operatively connected to at least one pin for raising said pin to a notched portion in said notched plate; and
   a second pneumatically operated cylinder operably coupled to said slide for moving it rearwardly and then forwardly in said fender whereby the notched plate and disk are rotated through a 180° turn, both of said cylinders coupled to said vacuum source.

2. The combination as set forth in claim 1 wherein said first cylinder for raising said pin comprises a vertically oriented pneumatic cylinder and wherein said second cylinder coupled to said slide for moving it comprises a horizontally oriented pneumatic cylinder.

3. The combination as set forth in claim 1 including a base for guiding the movement of said slide, said base having a pair of longitudinal channels formed in its sides for containing said slide.

4. The combination as set forth in claim 1 wherein said two pneumatic cylinders are sequentially operated by a pushbutton operating device mounted inside said automobile.

5. The combination as set forth in claim 1 wherein said slide and said disk are both mounted on a longitudinally oriented base mounted inside the fender of said automobile.

* * * * *